(No Model.)
U. M. HOPKINS.
HARROW.
No. 281,187.  Patented July 10, 1883.
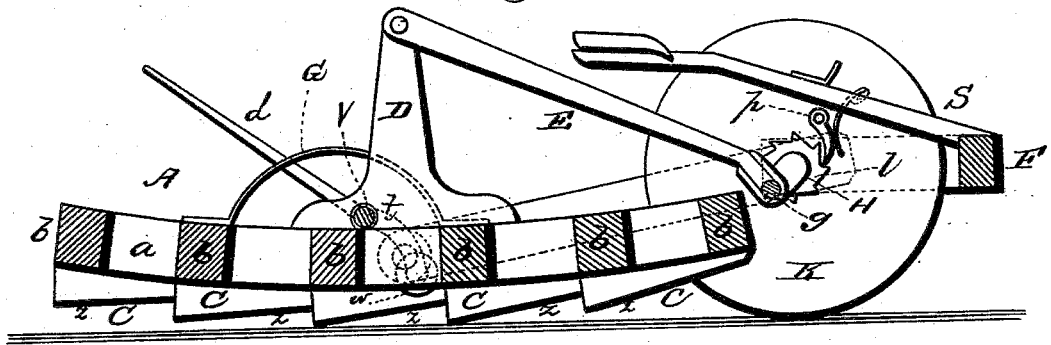
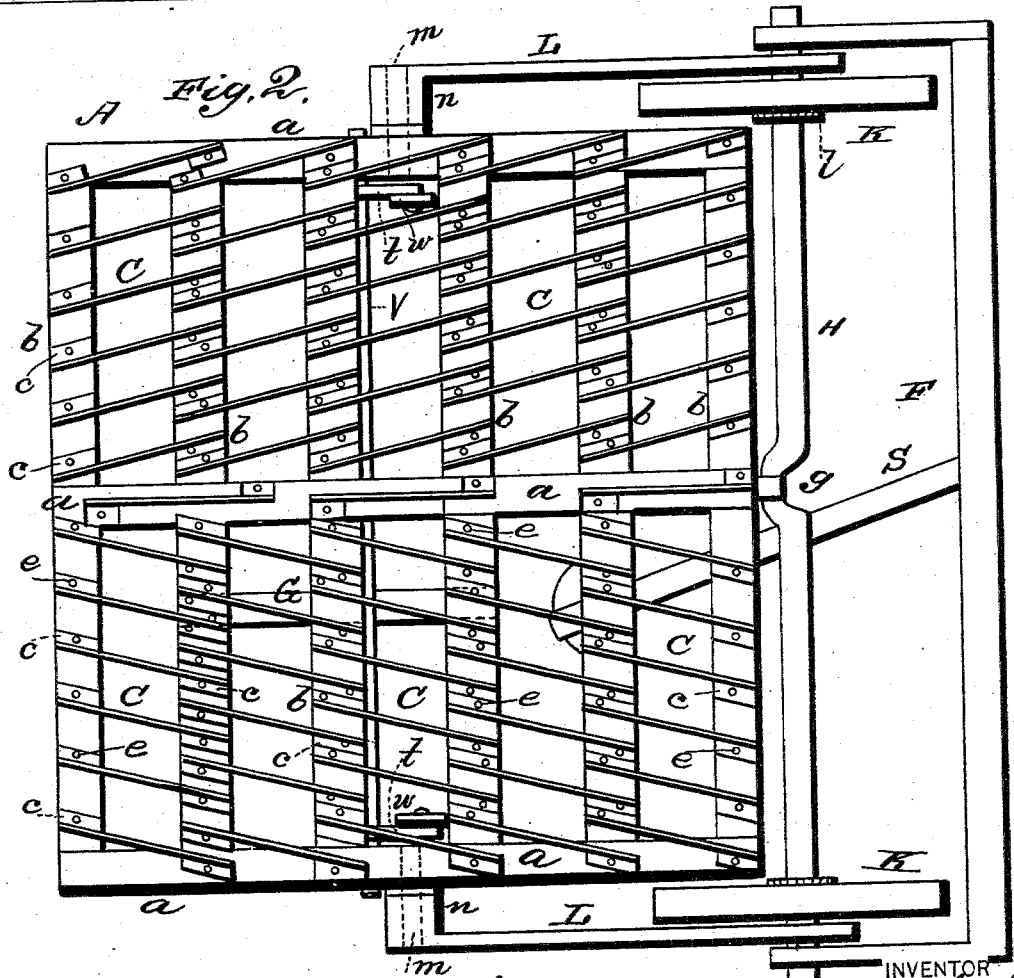
WITNESSES
E. H. Bates.
Philip C. Masi.
INVENTOR
Uri M. Hopkins
by Anderson & Smith
his ATTORNEYS
N. PETERS, Photo-Lithographer, Washington, D. C.

UNITED STATES PATENT OFFICE.

URI M. HOPKINS, OF LOVETT, INDIANA.

HARROW.

SPECIFICATION forming part of Letters Patent No. 281,187, dated July 10, 1883.

Application filed March 10, 1883. (No model.)

*To all whom it may concern:*

Be it known that I, URI M. HOPKINS, a citizen of the United States, residing at Lovett, in the county of Jennings and State of Indiana, have invented certain new and useful Improvements in Harrows; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my harrow, and Fig. 2 is a bottom view of the same.

This invention has relation to harrows and cultivators; and it consists in the construction and novel arrangement of the frame, having an under convex or rocking form from front to rear, the wheels and crank-axle, the pitman connected to a rigid upright standard of the rocking frame, and the side arms connecting the axle ends to the pivotal portions of the rocking frame, the oblique blade-formed teeth having their lower or rocking edges sloping forward and upward, the adjustable transverse shaft, carrying arms having caster-wheels on their lower ends, and the draft-frame pivoted to the axle, and having rigidly-attached shafts or pole, whereby the seat is supported in a steady manner, all as hereinafter set forth.

In the accompanying drawings, the letter A designates the rocking frame, which consists of the longitudinal bars $a$, curved in under convex or rocker form from front to rear, and connected by the straight transverse bars $b$, which carry the teeth C.

To the top of the frame is secured in rigid manner the standard D, to which is pivoted one end of the pitman E, the other end of which is connected to the crank $g$ of the axle H, which extends in front of the harrow sufficiently to receive the wheels K. Usually I provide the wheels with spring-pawls $p$ and the axle with ratchets $l$, which are engaged by said spring-pawls, and are designed to hold the axle in rigid connection with the wheels for direct motion, and to allow the wheels to move backward without turning the axle. As the wheels move forward, the harrow-frame A is gently but positively rocked, so that it operates at only a portion of its length at one time; but as the rocking motion is continuous the action of the harrow is very effective.

To each side bar of the frame A is secured a journal, $m$, which engages a bearing, $n$, in the rear end of a draft-arm, L, the front end of which is connected to the axle.

F represents the front transverse frame, to which the pole or a pair of shafts is rigidly attached, and which is connected to the axle. The seat-arm S is rigidly secured to this frame.

V indicates a transverse rock-shaft, which is pivoted in bearings at the middle portion of the rocking frame, and is provided with arms $t$, to the lower ends of which caster-wheels $w$ are pivoted. The rock-shaft is provided with a lever-arm, $d$, which is designed to facilitate the adjustment of the shaft and its caster-wheels. The lever-arm $d$ is held in position after adjustment by the arch-rack G. In order to raise the body of the rocking frame in turning or in moving, when the working effect of the harrow is not desired, the rock-shaft is turned to depress the arms $t$, so that their caster-wheels will bear on the ground and support the harrow above it. When the arms $t$ are raised, the harrow is let down upon the ground in working position.

The teeth C, employed on the convex under surface of the harrow, are usually of elongated blade form, extending obliquely from front to rear, and having their lower or working edges, $z$, sloping upward from the rear forward. Each tooth extends from one of the transverse bars $b$ to the next, and is provided with a lug or lugs, $c$, at each end, which are perforated for the passage of the bolts $e$, which serve to secure the tooth to the respective bars at each end thereof. On each side of the harrow the teeth extend forward and outward obliquely. Along the under side of the central longitudinal bar of the frame A a series of blade-form teeth extending directly forward may be provided.

This harrow has a light draft, because, although its teeth are constantly in motion, only one portion thereof is at work at one time. Its action is speedy and effective.

Having described this invention, what I claim, and desire to secure by Letters Patent, is—

1. A drag-harrow and cultivator-frame having an under convex or rocker form from front to rear, substantially as specified.

2. A drag-harrow and cultivator having driving-wheels and a crank-axle, a rocking harrow-frame connected to the axle by side arms, and having a rigid standard connected to the axle-crank by a pitman, substantially as specified.

3. A drag-harrow having a rocking frame consisting of curved longitudinal bars and straight transverse bars, and oblique blade-formed teeth, having upwardly and forwardly inclined lower edges, and respectively secured each to two successive straight transverse bars of the frame, substantially as specified.

4. The drag-harrow and cultivator consisting of the rocking frame carrying oblique teeth, and having a transverse rock-shaft provided with caster-arms and an operating-lever, the crank-axle, and pitman connected to a rigid standard of the rocking frame, the side connections from the axle to the rocking frame, and a draft-frame, substantially as specified.

In testimony whereof I affix my signature in presence of two witnesses.

URI METCALF HOPKINS.

Witnesses:
WILLIAM A. HAZELRIGG,
CHARLES HAZELRIGG.